(No Model.)
W. SCHRADER.
FORK.
No. 509,103. Patented Nov. 21, 1893.
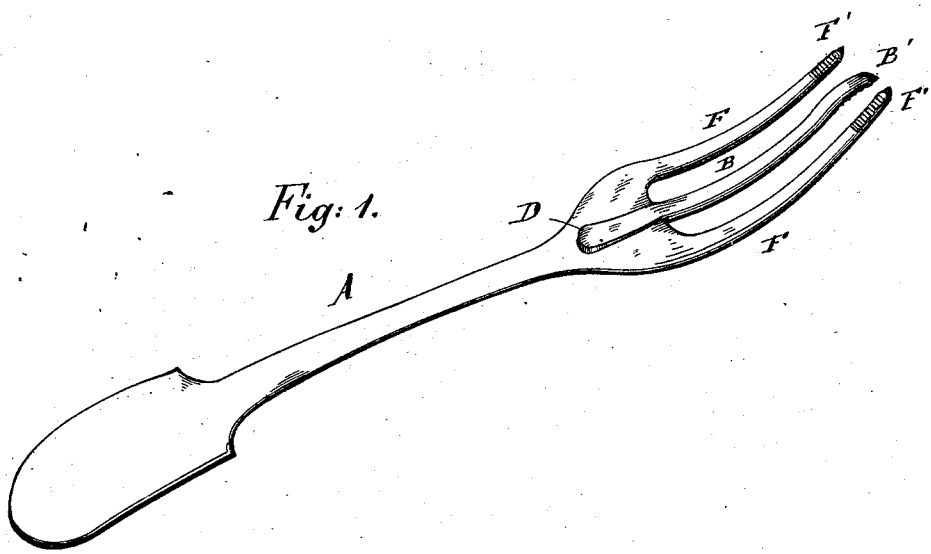
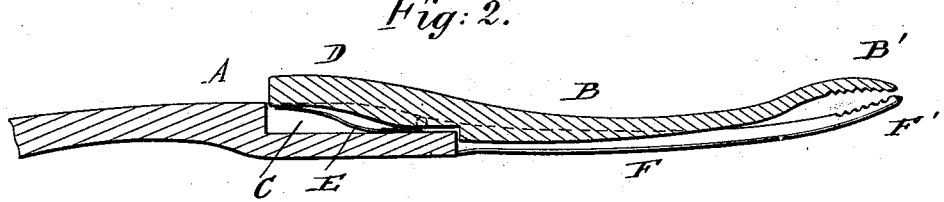
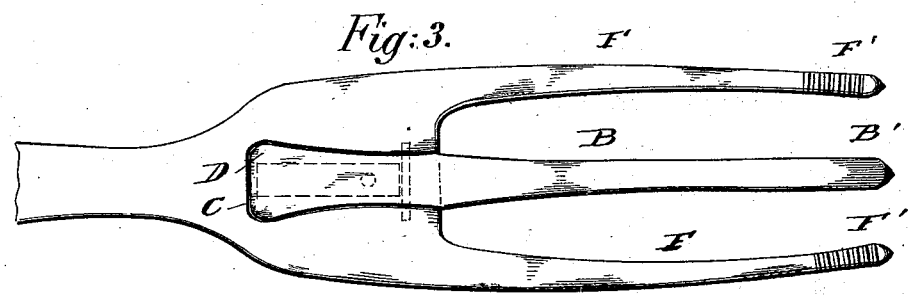
WITNESSES:
Charles Schroeder
Adolph Scherer
INVENTOR
W. Schrader
BY
Guépel & Raegener
ATTORNEYS.
THE NATIONAL LITHOGRAPHING COMPANY,
WASHINGTON, D. C.

UNITED STATES PATENT OFFICE.

WILLIAM SCHRADER, OF RICHMOND HILL, NEW YORK.

FORK.

SPECIFICATION forming part of Letters Patent No. 509,103, dated November 21, 1893.

Application filed May 2, 1893. Serial No. 472,715. (No model.)

*To all whom it may concern:*

Be it known that I, WILLIAM SCHRADER, a citizen of Germany, and a resident of Richmond Hill, in the county of Queens and State of New York, have invented certain new and useful Improvements in Forks, of which the following is a specification.

This invention relates to improvements in forks, and the object of my invention is to provide a fork which is so constructed that it can be adapted for holding a bone while carving poultry or other meats, or while eating such poultry or other meats.

The invention consists in a fork having one or two middle prongs pivoted and acted upon by a spring to hold them in normal position. The several prongs of the fork have the outer ends slightly curved and serrated so as to have a firm hold on the bone.

In the accompanying drawings, Figure 1 is a perspective view of my improved fork. Fig. 2 is a vertical longitudinal sectional view of the pronged end of the same, on an enlarged scale. Fig. 3 is a plan-view of the same, drawn on an enlarged scale, and Fig. 4 is a plan-view of a fork having the two central prongs pivoted.

Similar letters of reference indicate corresponding parts.

The fork A, which may be made of any suitable metal and any desired shape, either with three or four prongs, has a central prong B pivoted at its inner end on a recess C in the top of the fork, the rear end of said prong extending beyond the pivot, so as to form a finger rest D. A suitable spring E fastened in the bottom of the recess C bears against the under side of said finger-rest D and presses the same upward, thereby pressing the front end of the prong B downward into the same plane with the remaining fixed prongs F. The ends of the prongs F have their free ends F' serrated on the upper surface, and the pivoted prong B has its free end B' serrated on the under surface, said free end B' being slightly curved as shown.

To grasp a bone the finger-rest D is pressed downward whereby the free end of the prong B is raised from the plane of the fixed prongs F, so as to permit inserting the bone between the prongs. As soon as the finger is removed from the finger rest D, the spring E presses the rear end of the prong upward, thereby pressing the free or front end down upon the bone, which is thus held securely by the several prongs of the fork. The bone can easily be released by simply pressing on the finger-rest D of the pivoted prong.

The fork can be used in the ordinary manner and when required to hold a bone all that is necessary is to press the finger-rest in the manner described. In eating poultry, fish, &c., it is very unpleasant to grasp the bones with the fingers and the table cloth is frequently soiled by making attempts to hold the bone with an ordinary fork. All these inconveniences are avoided by means of my improved fork.

Having thus described my invention, I claim as new and desire to secure by Letters Patent—

1. A fork, constructed with fixed prongs, a pivoted prong between the fixed prongs, which pivoted prong has a finger-rest beyond the pivot and a spring acting on said pivoted prong, substantially as set forth.

2. A fork constructed with fixed prongs, having their free ends serrated on the upper surfaces, and a pivoted prong between the fixed prongs, which pivoted prong has its free end curved slightly and has serrations on the under side of said curved part, substantially as set forth.

In testimony that I claim the foregoing as my invention I have signed my name in presence of two subscribing witnesses.

WILLIAM SCHRADER.

Witnesses:
OSCAR F. GUNZ,
H. WILLARD GRIFFITHS.